(12) United States Patent
Ayachitula et al.

(10) Patent No.: US 7,822,785 B2
(45) Date of Patent: Oct. 26, 2010

(54) METHODS AND APPARATUS FOR COMPOSITE CONFIGURATION ITEM MANAGEMENT IN CONFIGURATION MANAGEMENT DATABASE

(75) Inventors: Naga A. Ayachitula, Elmsford, NY (US); Krishna S. Garimella, San Jose, CA (US); Yan Or, San Francisco, CA (US); Larisa Shwartz, Scarsdale, NY (US); Maheswaran Surendra, Croton-On-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 11/478,745

(22) Filed: Jun. 30, 2006

(65) Prior Publication Data
US 2008/0005186 A1    Jan. 3, 2008

(51) Int. Cl.
*G06F 17/30* (2006.01)
(52) U.S. Cl. .................................................. 707/804
(58) Field of Classification Search .................. 707/804
See application file for complete search history.

(56) References Cited

U.S. PATENT DOCUMENTS

| 6,449,624 B1* | 9/2002 | Hammack et al. ........... 707/203 |
| 2006/0004875 A1* | 1/2006 | Baron et al. ................ 707/200 |
| 2007/0203952 A1* | 8/2007 | Baron et al. ................ 707/200 |
| 2007/0282856 A1* | 12/2007 | Mueller et al. ................ 707/10 |

OTHER PUBLICATIONS

Volzer, Technical Report No. 02-07, A Tool for Subsystem Configuration Management, Mar. 18, 2002, pp. 1-11.*
Simon Lock, The Management of Socio-technical Systems using Configuration Modeling, Human Systems Management vol. 23 (1), 2004, pp. 1-38.*

* cited by examiner

*Primary Examiner*—James Trujillo
*Assistant Examiner*—Albert Phillips
(74) *Attorney, Agent, or Firm*—Kenneth R. Corsello; Ryan, Mason & Lewis, LLP

(57) ABSTRACT

Methods and apparatus of managing a CMDB are provided. At least one composite CI is utilized in the CMDB. The at least one composite CI is represented as a graph of navigable relationships between one or more supporting elements in accordance with a template. The one or more supporting elements comprise at least a root element of the composite CI.

22 Claims, 15 Drawing Sheets

CONTAINMENT GRAPH

IMPLYING RELATIONSHIPS BETWEEN COMPOSITES BASED ON ITS RELATIONSHIPS BETWEEN ITS ELEMENTS

IF A PORT IS CONNECTED TO A NIC, ONE CAN CONSTRUCT A RELATIONSHIP/MEMBERSHIP BETWEEN SWITCH AND SERVER COMPOSITIONS

METHODS AND APPARATUS FOR COMPOSITE CONFIGURATION ITEM MANAGEMENT IN CONFIGURATION MANAGEMENT DATABASE

CROSS REFERENCE TO RELATED APPLICATIONS

This application is related to: the U.S. patent application Ser. No. 11/478,747, entitled "Methods and Apparatus for Global Service Management of Configuration Management Databases;" the U.S. patent application Ser. No. 11/479,532, entitled "Methods and Apparatus for Automatically Creating Composite Configuration Items in Configuration Management Database;" the U.S. patent application Ser. No. 11/479,356, entitled "Methods and Apparatus for Scoped Role-Based Access Control;" and the U.S. patent application Ser. No. 11/479,514, entitled "Methods and Apparatus for Managing Configuration Management Database via Composite Configuration Item Change History" which are filed concurrently herewith and incorporated by reference herein.

FIELD OF THE INVENTION

The present invention relates to information technology (IT) systems and, more particularly, methods and apparatus for providing composite configuration items (CI) for management of a configuration management database (CMDB).

BACKGROUND OF THE INVENTION

Large and complex IT service management environments that provide multiple services to a plurality of customers can create an unmanageable number of entities. CMDB CIs represent an extensive range of logical and physical entities and their complex relationships. A typical implementation of a CMDB may contain more than 800 abstract object classes, with implicit and explicit relationships between them that may be extended in an open-ended fashion. Organizing entities into dependency trees or graphs for a high-level view of the topology eases systems management. A CMDB is broad and semantically rich enough that it may apply to higher layers such as, for example, a business process or a distributed application. A CMDB is also granular enough to represent, for example, tables in a database or enterprise Java beans (EJBs) used in an enterprise application. In real-world enterprise systems, there may be tens of thousands or more entities with complex relationships between them. Compositions are ideally suited to multi-layered topologies.

The more levels in a CMDB, the more information there is to be handled. This results in larger and more complex CMDB elements. The fewer levels in a CMDB, the less control and information there are about the IT infrastructure. If the CMDB scope is too narrow, important parts of the infrastructure are not easily checked. If the CMDB scope is too wide, the cumbersome database will be an obstacle that slows down all service and management processes. If there are too many levels, attributes, and relationships, it will take processes a great effort to maintain the CMDB. Too little detail can mean recording insufficient information about the CI's and related incidents, problems, symptoms and requests for change (RFC).

SUMMARY OF THE INVENTION

In accordance with the aforementioned and-other objectives, the embodiments of the present invention are directed towards methods and apparatus for CMDB management through template-based composite CIs.

For example, in one aspect of the present invention a method of managing a CMDB is provided. At least one composite CI is utilized in the CMDB. The at least one composite CI is represented as a graph of navigable relationships between one or more supporting elements in accordance with a template. The one or more supporting elements comprise at least a root element of the composite CI.

In additional embodiments of the present invention, creation, retrieval, update, deletion and comparison actions are performed on the composite CI.

In this invention we propose novel approaches of compositions as manageable entities grouped with a subset of CIs pruned from a deeply connected tree or graph of CIs. The CI subset is defined by a composite template. This flexibility in composability is important since customers anticipate need to change the definitions of the existing composites based on their particular business needs. Users should see composite CIs no differently than regular CIs. Hence, composite CIs are modeled in a similar fashion as regular CIs. However, composite CIs exist as distinct elements in the CMDB database. Composite CIs are represented as a graph of supporting elements, which may consist of composite or regular CIs. The graph is to be constructed by navigating relationships based on the composite definition.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be described in detail below, the embodiments of the present invention introduce techniques for providing template-based composite CIs for management of a CMDB. Composites CIs are first class data objects driven by templates having buried semantics for extensibility. New templates may be defined at configuration time provided the CI types/attributes defined in the template are available in the CMDB.

Figure 1:
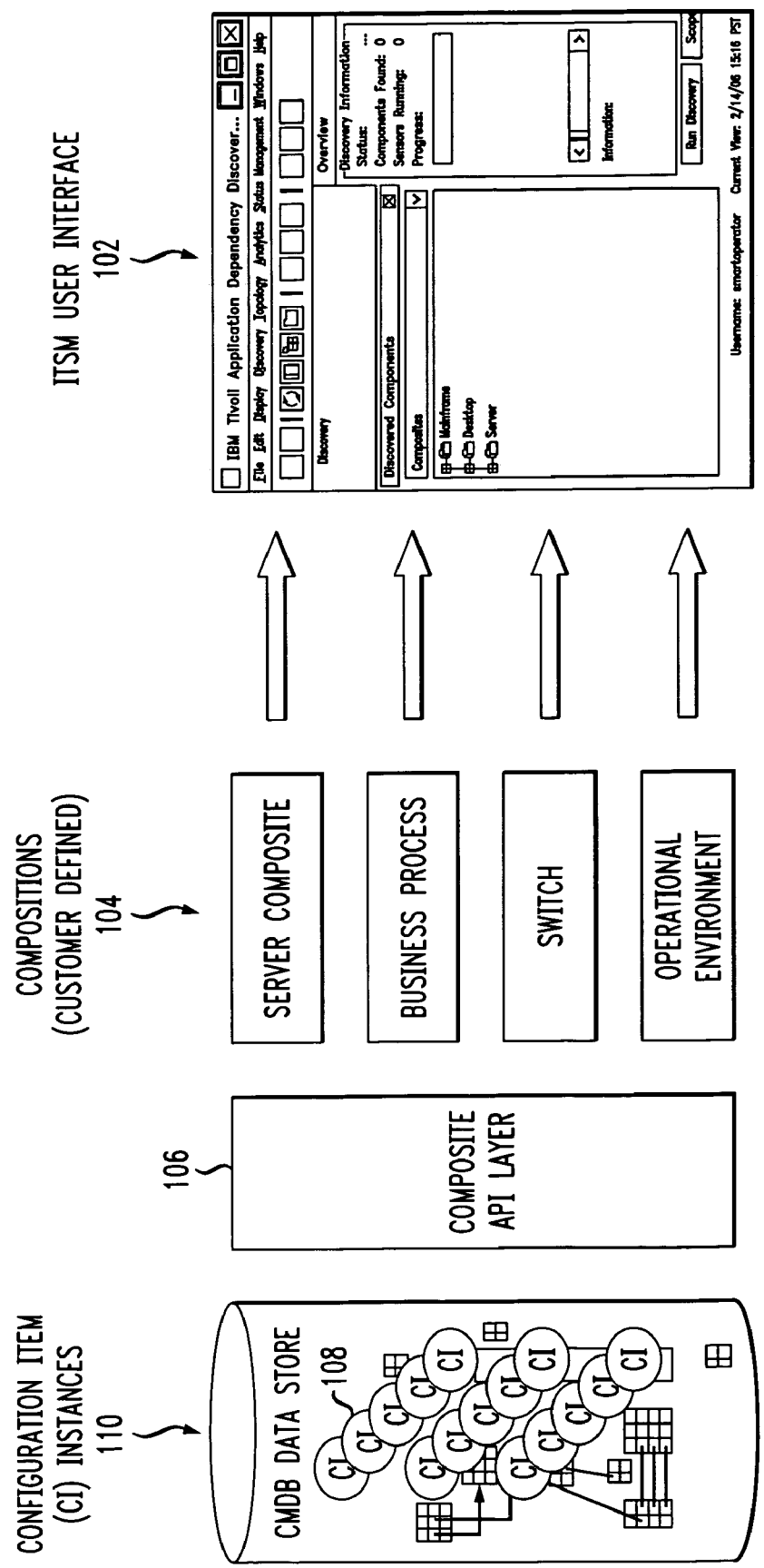
FIG. 1 is a diagram illustrating an composite CIs, according to an embodiment of the present invention.

Referring initially to FIG. 1, a diagram illustrates composite CIs, according to an embodiment of the present invention. A user, at user interface 102, views a composite CI 104 from composite API layer 106 no differently than an atomic CI 108 from data layer 110. As a result, composite CIs 104 are modeled in the same way as atomic CIs 108. However, composite CIs 104 exist as distinct elements in the CMDB database.

Composite CIs are represented as a graph of supporting elements, which may be composite or atomic CIs. The graph is constructed by navigating relationships based on the definition of what composed the CI. The definition will be for the maximal graph that can make up the composite. Not all possible supporting elements are required in the composite CI in order to have a valid composition; only the root element is required.

Figure 2:
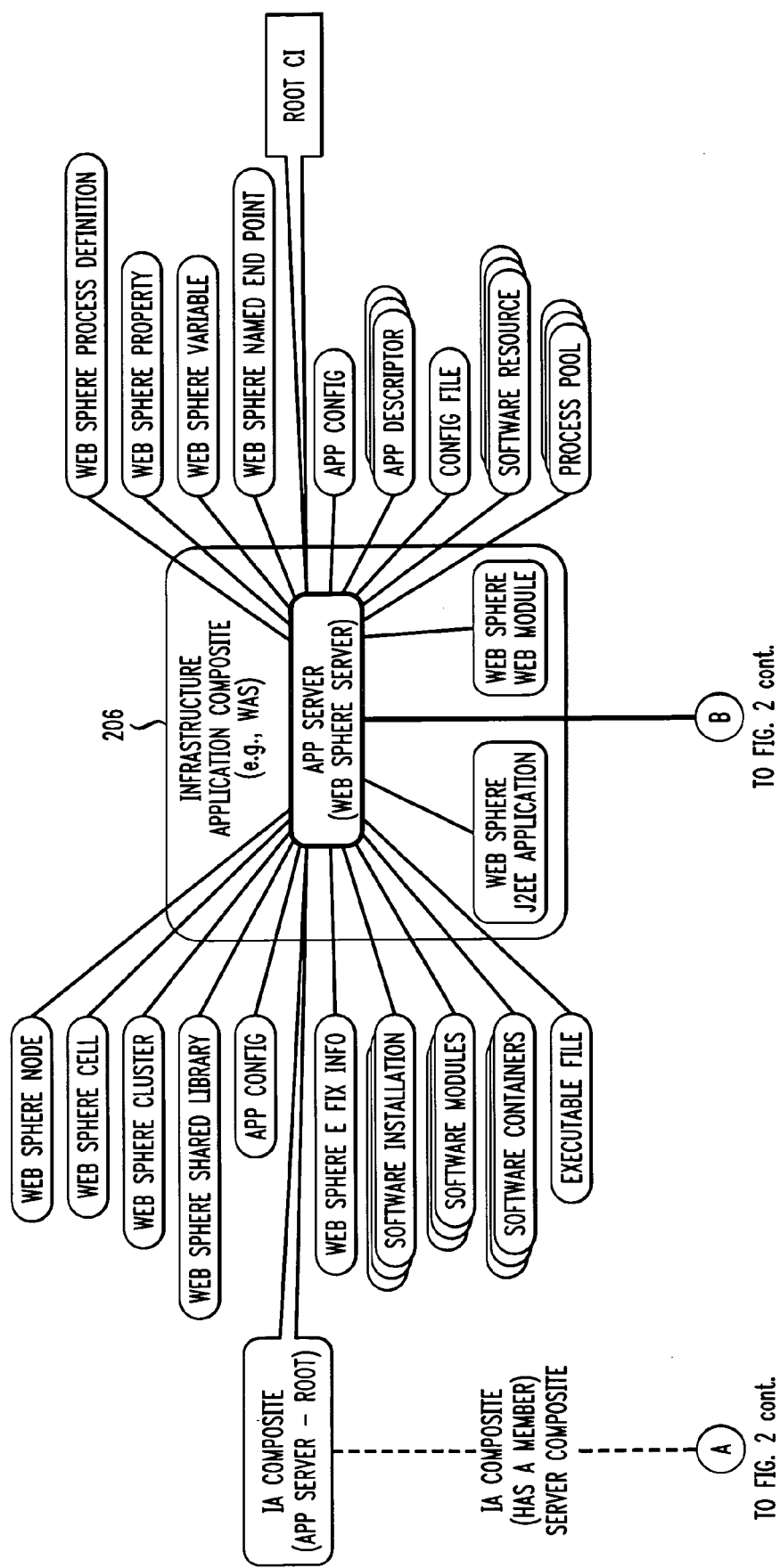
FIG. 2 is a diagram illustrating template-based composite CIs, according to an embodiment of the present invention.
Figure 2:
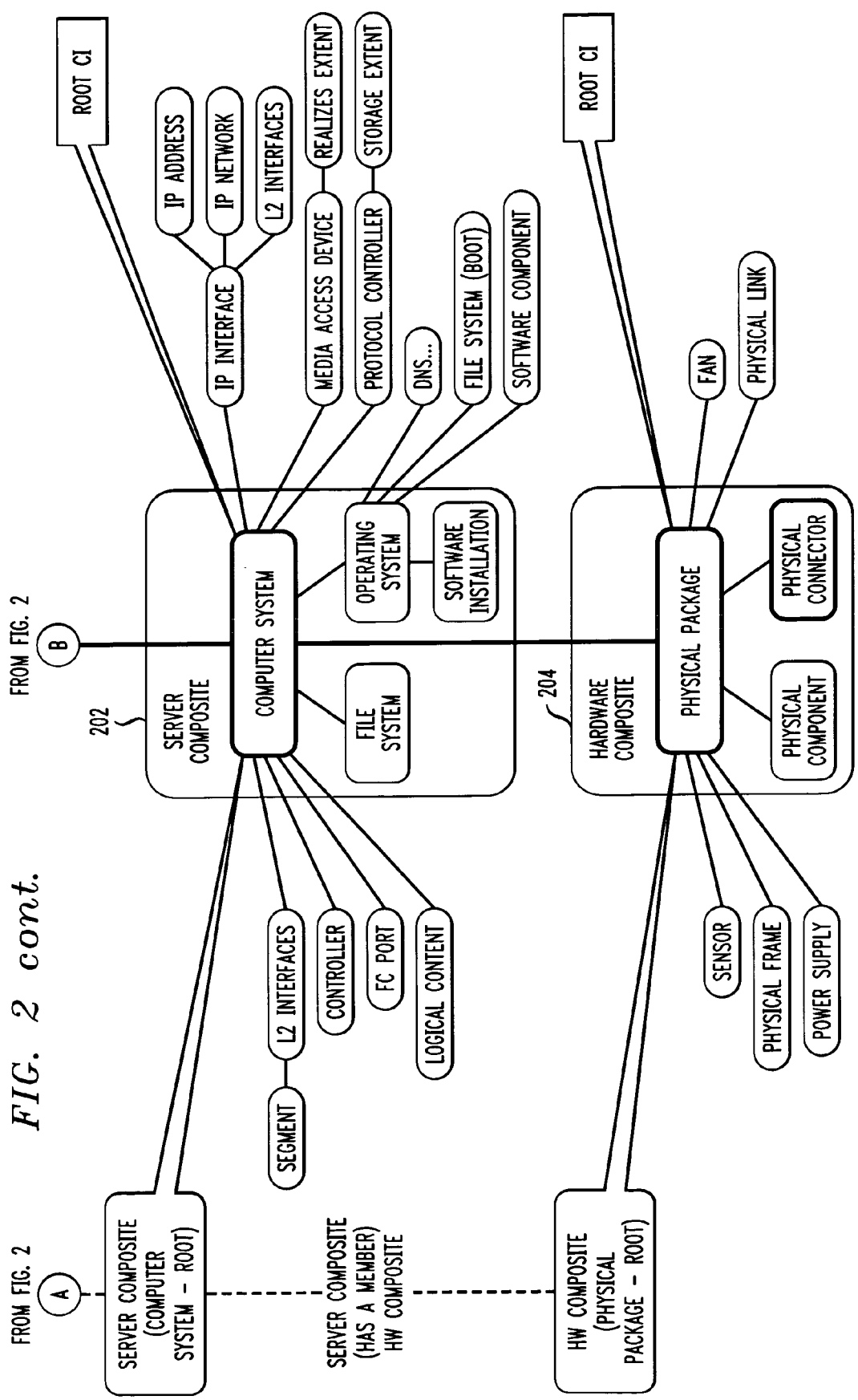

Referring now to FIG. 2, a diagram illustrates template-based composite CIs, according to an embodiment of the present invention. An example of a CI that is a composition of smaller entities, some of which are CIs themselves, is a server composite 202. A server composite 202 is made up of hardware 204, an operating system, installed and running software components, etc. An application composite 206 is also shown, and made up of software components and server composite 202 on which they run.

CIs can be composed by aggregating relationships to a main or root atomic CI. For example, a server has a root computer system object, which is related to hardware, operating system, software and networking elements. Further, an application has a root software system object that is related to underlying software components, which are in turn related to operating systems, software installations, software products, software updates, etc.

The identity of a composite CI is determined by the identity of its root atomic CI. Therefore, a root atomic CI must contain all the attributes necessary to identify the composite CI, even if some of those attributes are "derived" from supporting elements.

A composite CI can exist as long as its root atomic CI can be uniquely identified. The supporting elements can be added to, removed from, or updated in the composition over time. Thus, for example a server composite may be created with only a computer system element. The operating system, hardware and networking elements may be added at any time, without changing the identity of the server CI itself.

Figure 3:
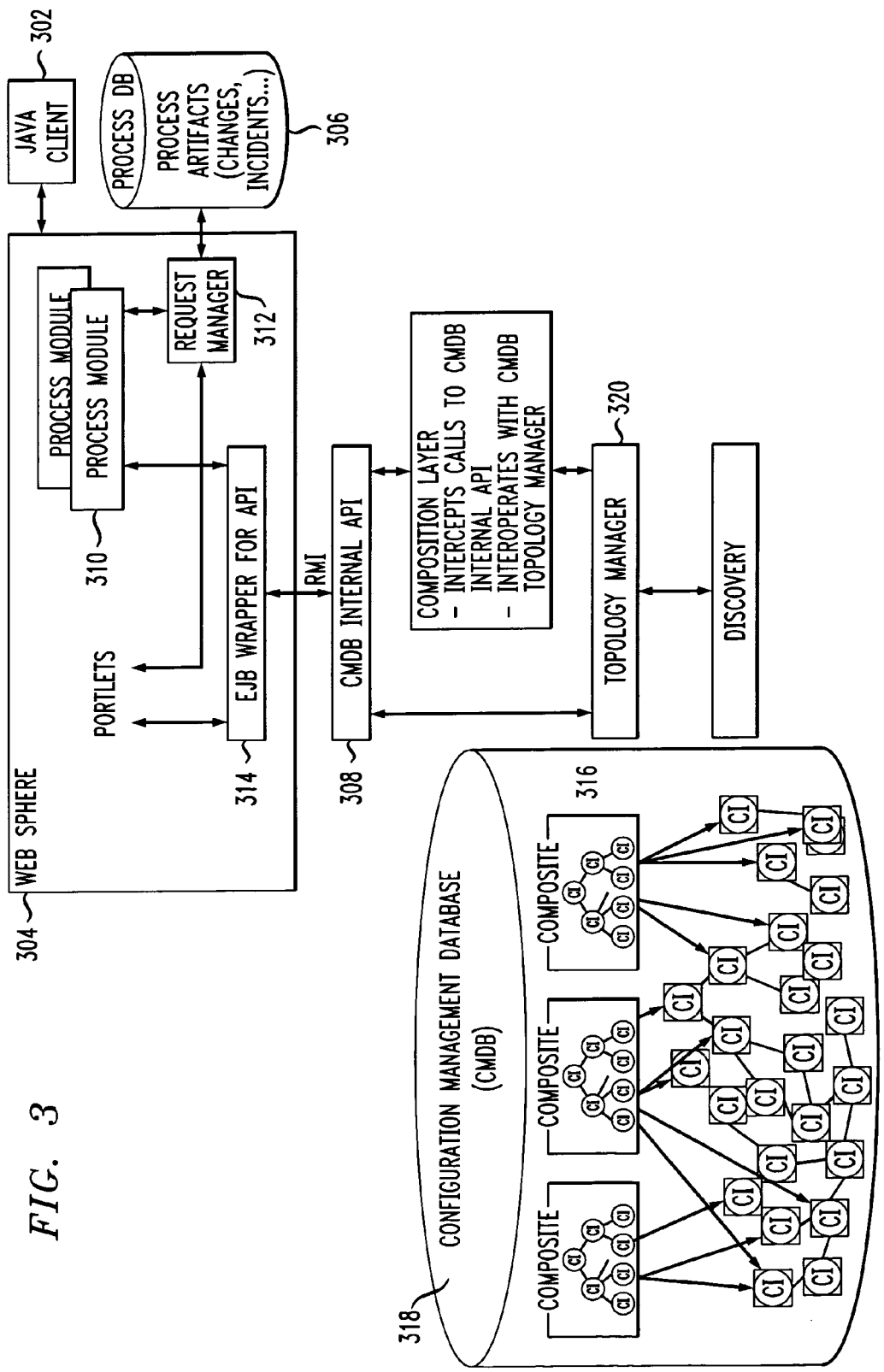
FIG. 3 is a diagram illustrating a CMDB having a composition layer with composite CIs, according to an embodiment of the present invention.

Referring now to FIG. 3 a diagram illustrates a CMDB having a composition layer with composite CIs, according to an embodiment of the present invention. In this specific embodiment, a java client 302 interacts with a websphere 304. Websphere 304 interacts with a process database 306 and a CMDB internal API 308 through process modules 310, a request manager 312 and an EJB wrapper 314 for API. Composition layer 316 of CMDB 318 interrupts calls to CMDB API 308 and interpolates with CMDB topology manager 320.

Figure 4:
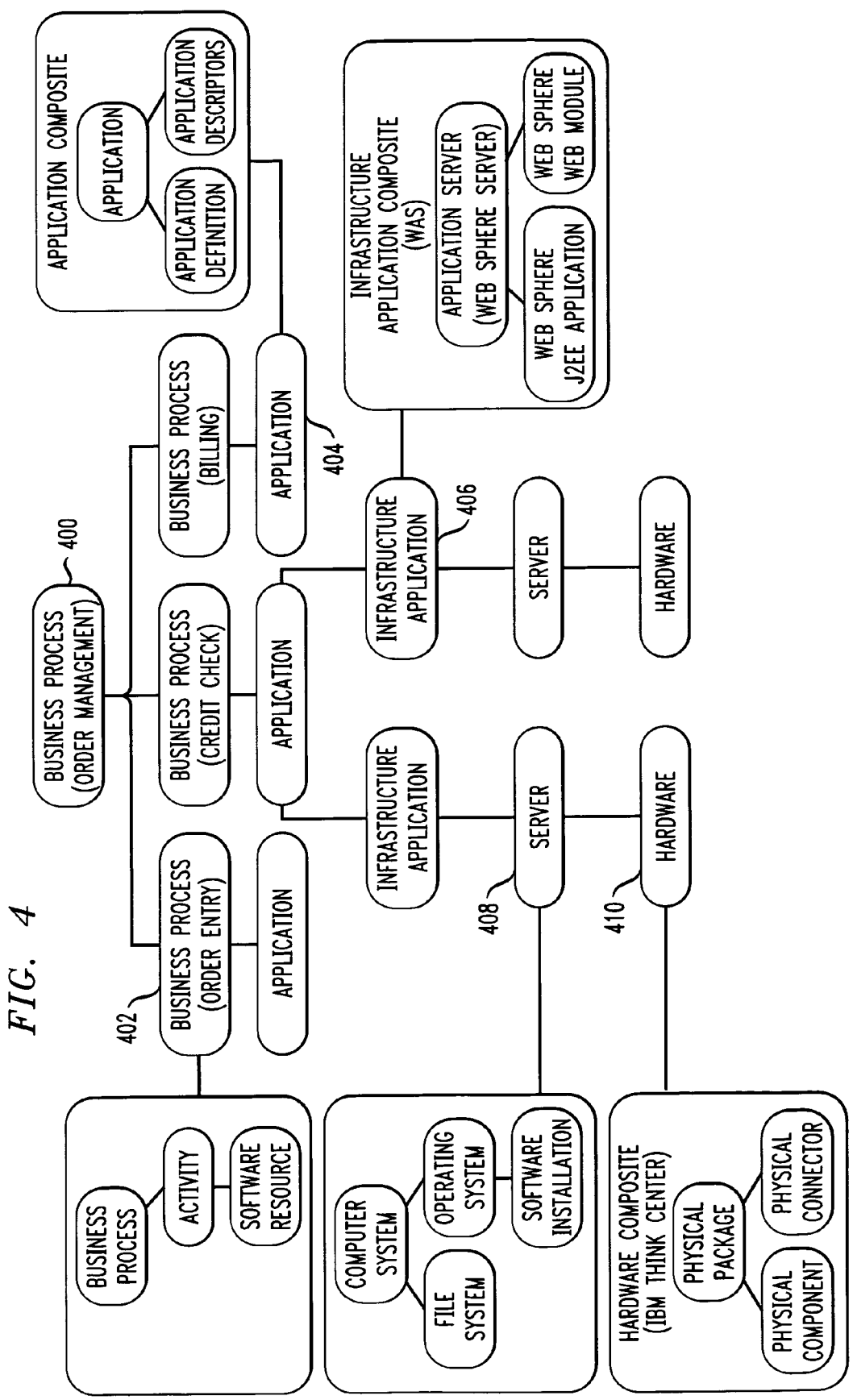
FIG. 4 is a diagram illustrating a large composite CI for a business process, according to an embodiment of the present invention.

Referring now to FIG. 4, a diagram illustrates a large composite CI for a business process, according to an embodiment of the present invention. This composite CI may be adopted from the CMDB model. Specifically, an order entry business process composite 402, a billing application composite 404, an infrastructure application composite 406, a server composite 408, and a hardware composite 410 are all shown in business process order management system 400.

Figure 5:
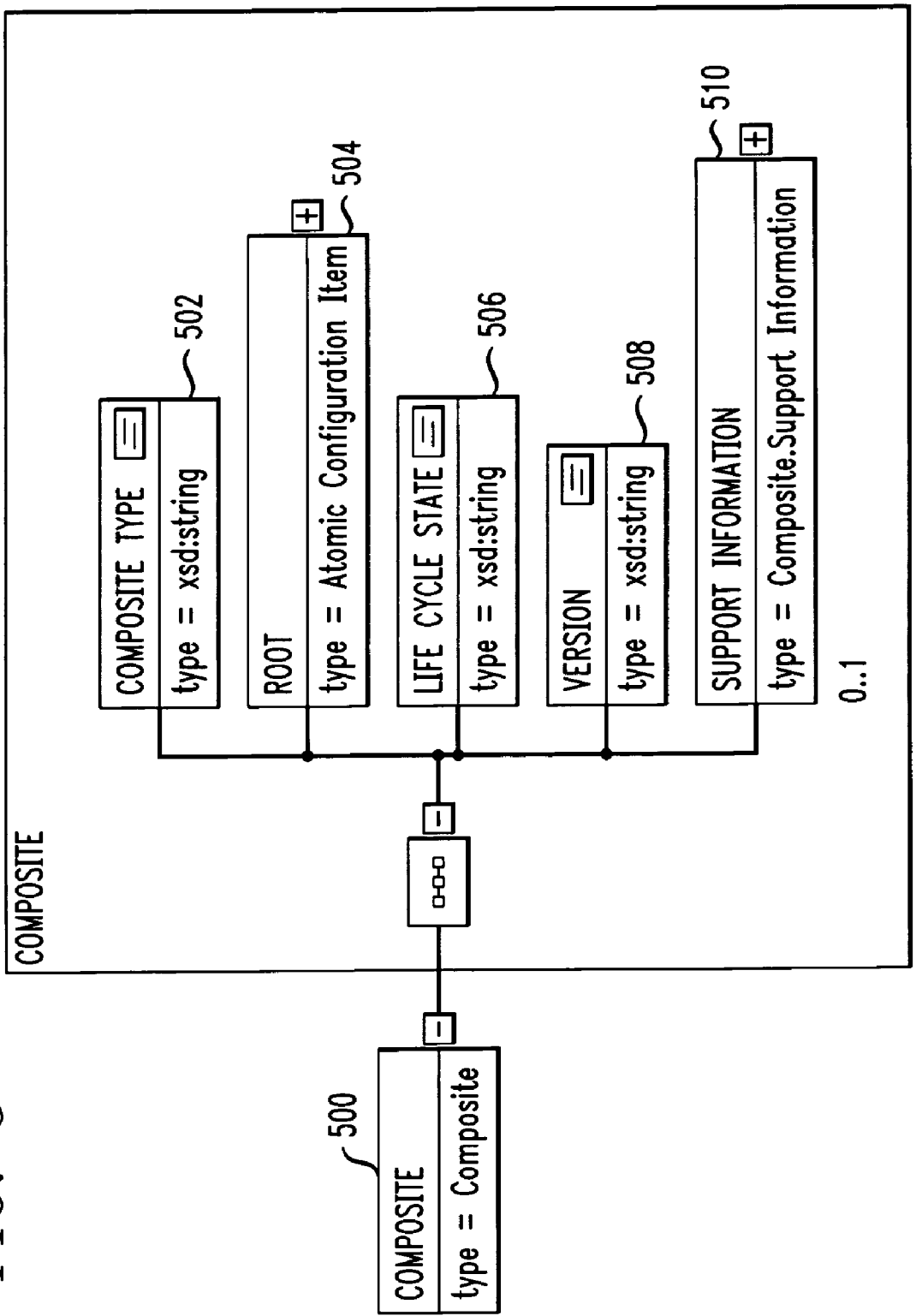
FIG. 5 is a diagram illustrating a generic composite CI schema, according to an embodiment of the present invention.

Referring now to FIG. 5, a diagram illustrates a generic composite CI schema, according to an embodiment of the present invention. A composite definition is an instance of a generic composite schema containing first level components. A composite type 502 describes a composite 500, such as, for example, server, hardware, and business process. A root 504 describes the root atomic CI of composite 500, for example, a computer system CI is the root atomic CI for a server composite. A life-cycle state 506 defines the current life-cycle state of composite 500. A version 508 describes the current version of composite 500. Support information 510 defines the support groups that are managing composite 500.

Figure 6:
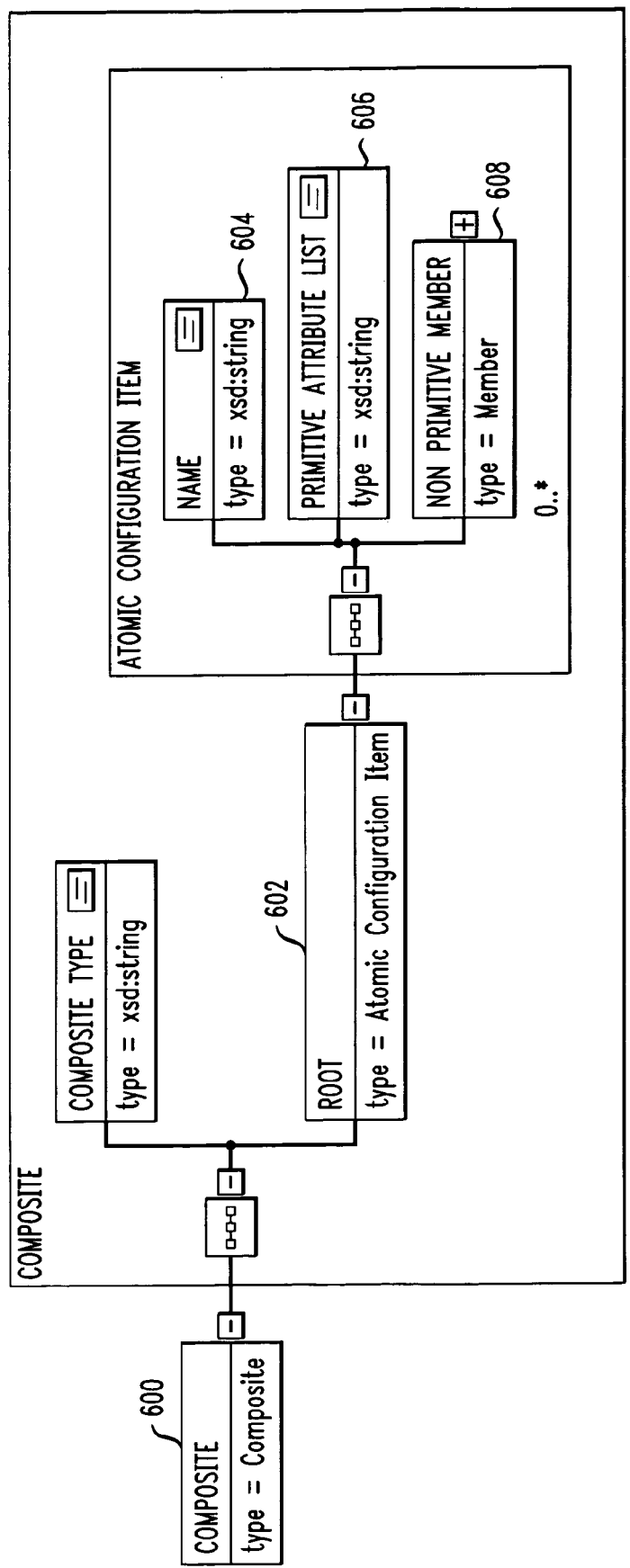
FIG. 6 is a diagram illustrating a root schema for a composite CI, according to an embodiment of the present invention.

Referring now to FIG. 6, a diagram illustrates a root schema of a composite CI, according to an embodiment of the present invention. As described above with regard to FIG. 5, general schema for a composite 600 includes a root 602. Root 602 is defined by a name 604, such as, for example, 'ComputerSystem.' Root 602 is further defined with a primitive attribute list 606 listing primitive attribute members of root 602. Finally, root 602 is defined through non-primitive members 608.

Figure 7:
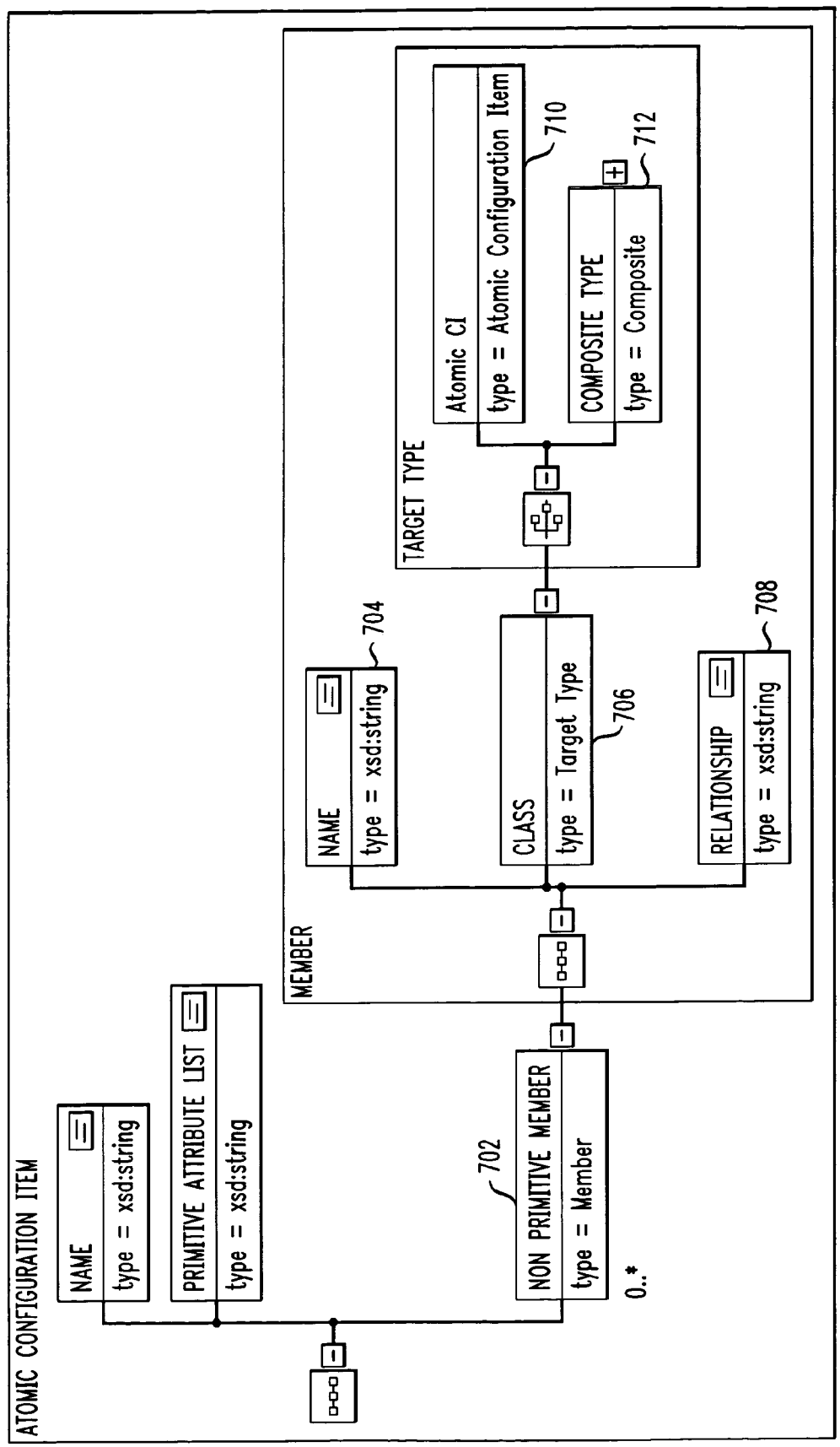
FIG. 7 is a diagram illustrating a non-primitive member schema of a root of a composite CI, according to an embodiment of the present invention.

Referring now to FIG. 7, a diagram illustrates a non-primitive member schema of a root of a composite CI, according to an embodiment of the present invention. As described above with regard to FIGS. 5 and 6, a composite includes a root which is defined having non-primitive member 702. Non-primitive member 702 is defined having a name 704, a class 706, and a relationship 708. Class 706 is further defined through an atomic CI 710 and a composite CI 712.

Figure 8:
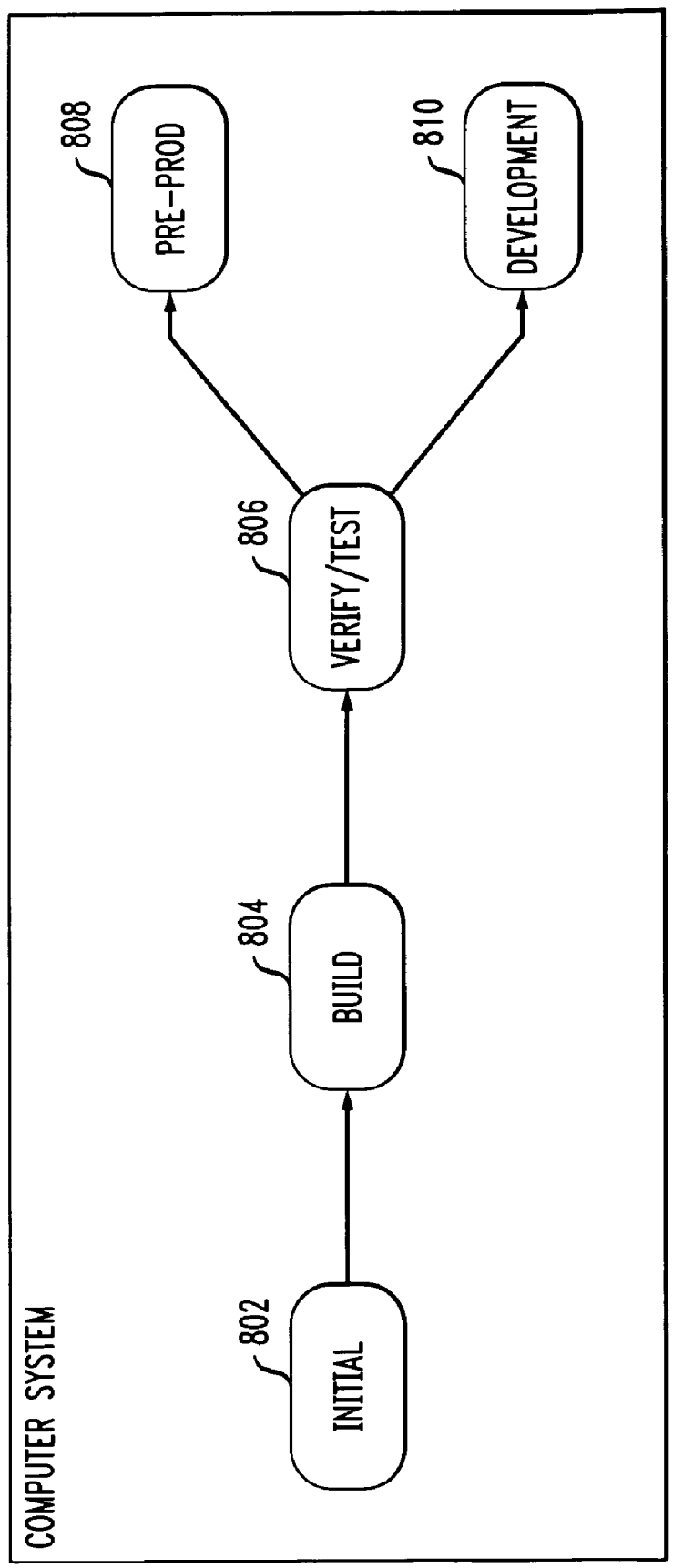
FIG. 8 is a diagram illustrating life-cycle states of a composite CI, according to an embodiment of the present invention.

Referring now to FIG. 8, a diagram illustrates life cycle states of a composite CI, according to an embodiment of the present invention. As described above with regard to FIG. 5, a general schema for a composite CI includes life cycle state. Life cycle states of a composite may include an initial state 802, a build state 804, a verification/test state 806, a pre-production state 808, and a development state 810.

Figure 9:
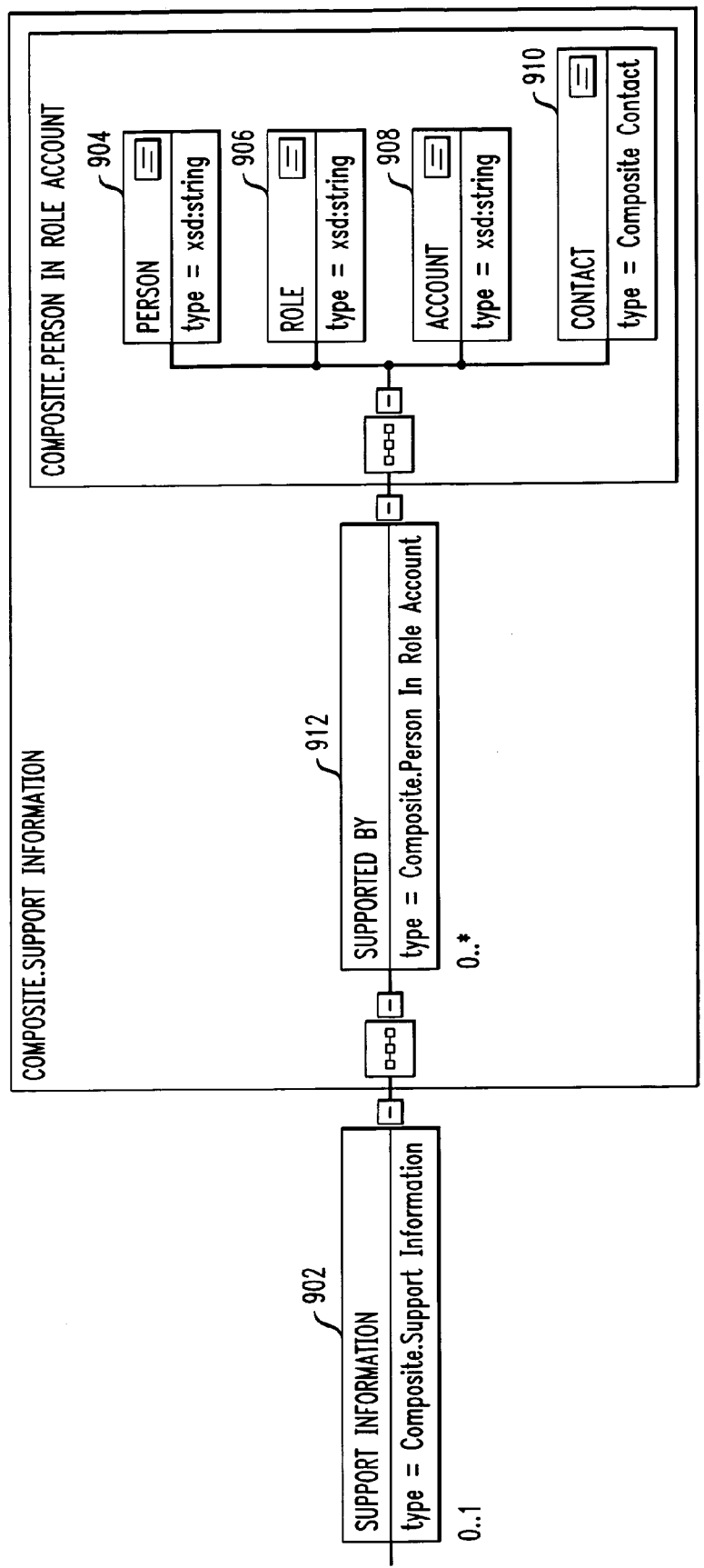
FIG. 9 is a diagram illustrating a support information schema of a composite CI, according to an embodiment of the present invention.

Referring now to FIG. 9, a diagram illustrates a support information schema of a composite CI, according to an embodiment of the present invention. As described above with regard to FIG. 5, general schema for a composite includes support information 902. Support information 902 defines a person 904, a role 906, an account 908 and a contact 910, which support 912 the composite CI. For example, support information may define the CI owner, as well as the change managers. Thus, any person having access to this information can determine who can do what on this composite as what role.

Figure 10:
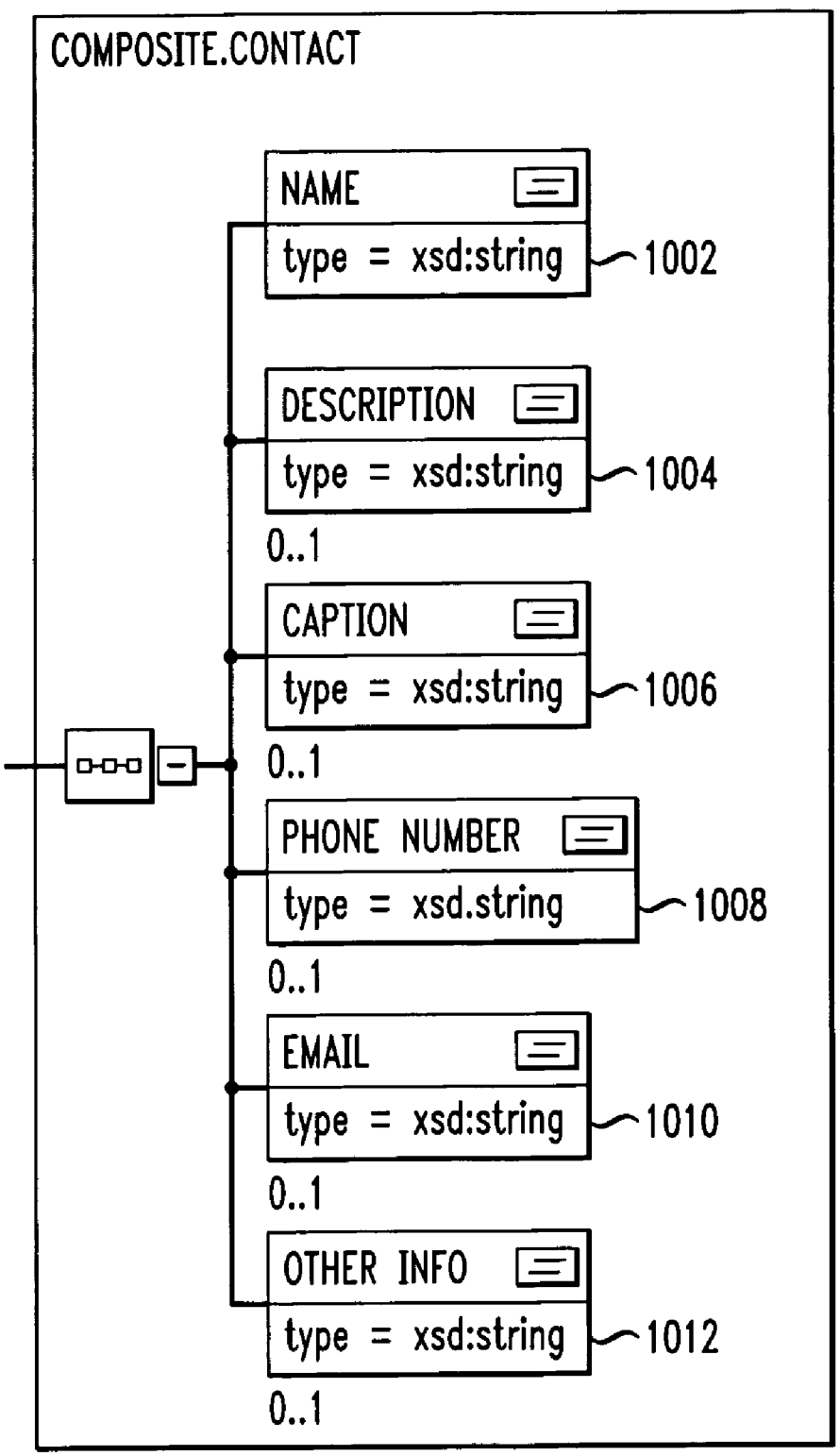
FIG. 10 is a diagram illustrating a contact schema for support information of a composite CI, according to an embodiment of the present invention.

Referring now to FIG. 10, a diagram illustrates a contact schema for support information of a composite CI, according to an embodiment of the present invention. As described above with regard to FIGS. 5 and 9, a composite includes support information which is defined by contact. Composite contact 1002 is defined by a name 1004, a description 1006, a caption 1008, a phone number 1010, an email 1012 and other information 1014.

An example of a schema definition for a composite CI is provided below:

block 1102 where it is determined if composite CIs are created automatically. If composite CIs are to be created automatically, it is determined in block 1104 whether a root atomic CI has been discovered. If a root atomic CI has been discovered a composite CI is created for the root atomic CI in block 1106. If a root atomic CI has not been discovered, the methodology remains at block 1104 until one is discovered. For example, creation of a discovered computer system CI will create a server CI because computer system CI is the root atomic CI of a server composite CI.

If composite CIs are not to be created automatically, and are instead created through a user interface, it is determined in block 1108, if a root atomic CI is known. If a root atomic CI is known, the methodology continues at block 1110 where the root atomic CI is specified, and the composite is created in block 1106. The root atomic CI attribute data may also be filled in from the user interface. If a root atomic CI is not

```
<?xml version="–1. 0" encoding="UTF-8"?>
<xsd:schema targetNamespace="
http://www.ibm.com/com/collation/proxy/api/server/composite/schema/"
xmlns:xsd="http://www.w3.org/2001/XMLSchema" xmlns="
http://www.ibm.com/com/collation/proxy/api/server/composite/schema/">
        <xsd:complexType name="Composite"
            <xsd:sequence>
                <xsd:element name="CompositeType" type="xsd:string">
</xsd:element>
                <xsd:element name="Root" type="AtomicConfigurationItem"
                    minOccurs="1" maxOccurs="1">
                </xsd:element>
            </xsd:sequence>
        </xsd:complexType>
        <xsd:element name="Composite" type="Composite"></xsd:element>
        <xsd:complexType name="AtomicConfigurationItem">
            <xsd:sequence>
                <xsd:element name="Name" type="xsd:string"></xsd:element>
                <xsd:element name="PrimitiveAttributeList"
                    type="xsd:string">
                </xsd:element>
            <xsd:element name="NonPrimitiveMember" type="Member"
                    maxOccurs="unbounded" minOccurs="0">
                </xsd:element>
            </xsd:sequence>
        </xsd:complexType>
        <xsd:complexType name="Member">
            <xsd:sequence>
                <xsd:element name="Name" type= "xsd:string"></xsd:element>
                <xsd:element name="Class" type="TargetType">
                    </xsd:element>
                <xsd:element name="Relationship" type="xsd:string"></xsd:element>
            </xsd:sequence>
        </xsd:complexType>
        <xsd:complexType name= "TargetType">
            <xsd:choice>
                <xsd:element name="AtomicCI"
                    type="AtomicConfigurationItem">
                </xsd:element>
                <xsd:element name="Composite" type="Composite"></xsd:element
            </xsd:choice>
        </xsd:complexType>
<xsd:schema>
```

Composite CIs are constructed using a template-based approach and the templates are externalized to customers. To help facilitate the move to this more configurable approach, all logic that determines the relationships to follow and the elements to include should be isolated so that it can be easily replaced by template-based logic.

Figure 11:
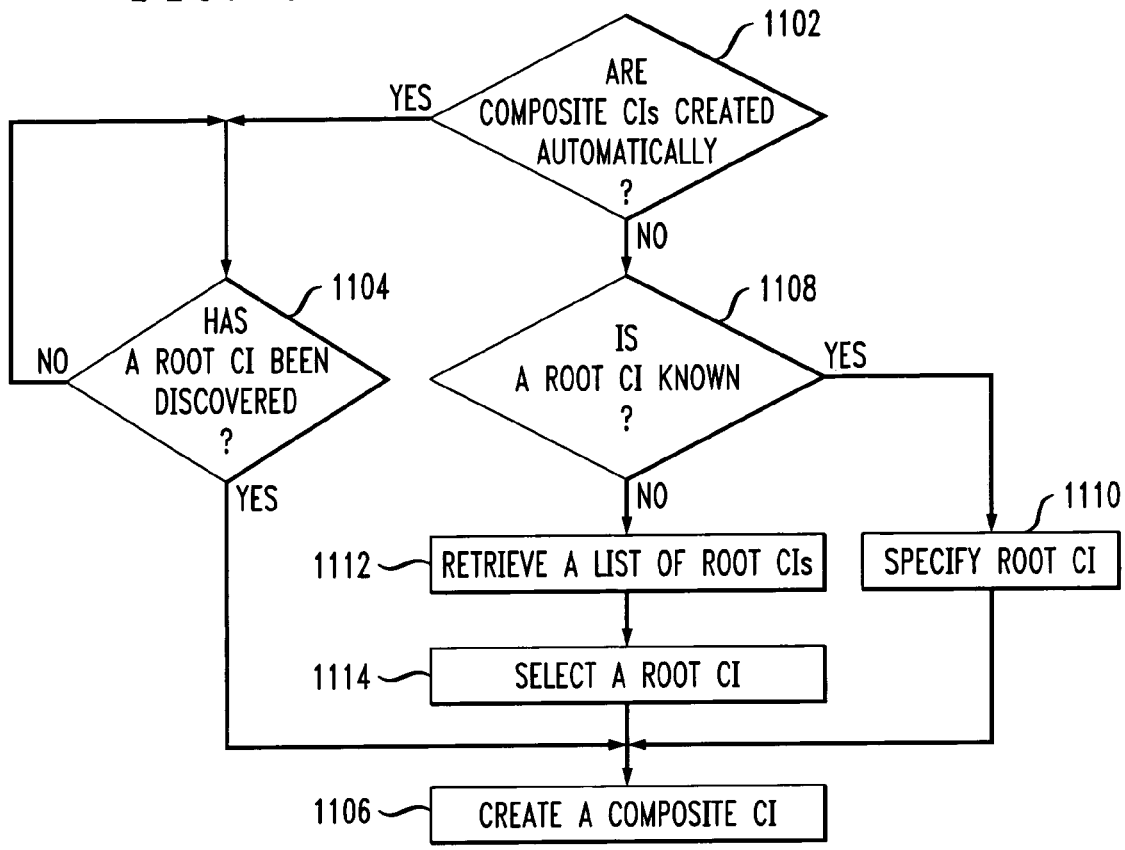
FIG. 11 is a flow diagram illustrating a composite CI creation methodology, according to an embodiment of the present invention.

Referring now to FIG. 11, a flow diagram illustrates a composite CI creation methodology, according to an embodiment of the present invention. The methodology begins in known, the methodology continues at block 1112, where a list of root atomic CIs are retrieved in accordance with specified search requirements. A list of eligible root atomic CIs are retrieved for the composite by specifying search criteria on the root atomic CI type attribute data. A root atomic CI is selected from the list in block 1114 and a composite CI is created in block 1106 terminating the methodology. A composite is created with a name, set of attributes, and associated naming rules to uniquely identify the composite instance.

The user interface should be aware of the composite model that it is working on, and provide the users the list of valid atomic CI types and relationships that can be instantiated/drawn based on its source/parent in the composite containment tree.

Figure 12:
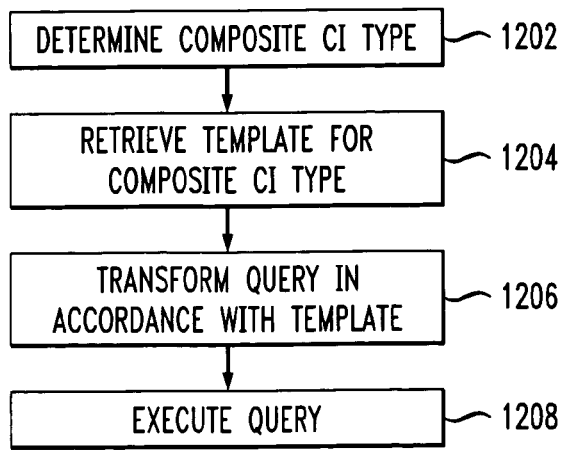
FIG. 12 is a flow diagram illustrating a composite CI information retrieval methodology, according to an embodiment of the present invention.

Referring now to FIG. 12, a flow diagram illustrates a composite CI information retrieval methodology, according to an embodiment of the present invention. The APIs used to access the composite CIs are responsible for building the appropriate composite graph object for queries, and for decomposing the composite graph object into appropriate supporting elements/relationships on a create/update. The methodology begins in block 1202, where a desired composite CI type is determined. In block 1204, a template for the composite CI type is retrieved. For performance purposes, the template and its generated composite metadata may be cached in memory. The template provides structural information about what atomic CI types and attributes that participate in the composition.

In block 1206, a query is transformed in accordance with the template of the composite CI type. In order to retrieve information of a composite instance a CMDB find( . . . ) internal API call is used to search and retrieve information of a specific composite instance. The original find( . . . ) query may contain conditionals that can search all CI types and attributes in CMDB. No restrictions in search are enforced. This should be noted as it is a design decision not to restrict the search by only template CI types and attributes. The original find( . . . ) query is transformed, through a search and replace with corresponding atomic CI types/attributes from the composite template definitions. In block 1208, the transformed query is executed on the CMDB A variant of the find( . . . ) query can retrieve only the top level CI of the composite and not the full containment tree. Another variant of the find( . . . ) query can retrieve full containment trees including sub-composites based on the template the atomic CIs, and composites (within the composite) will be traversed and the CI attributes are transformed into a CMDB generic API calls to retrieve atomic CI instances and their attributes.

The find( . . . ) method would return a single composite model object that encompasses all the containment information. For display purposes, the user interface should traverse the model object, just like any other standard CMDB model objects, but should be aware of the containment model. The composite also contains lifecycle, and version information as attributes. For support information of all people and their roles (and accounts) that are supporting the composite a separate query should be issued.

Figure 13:
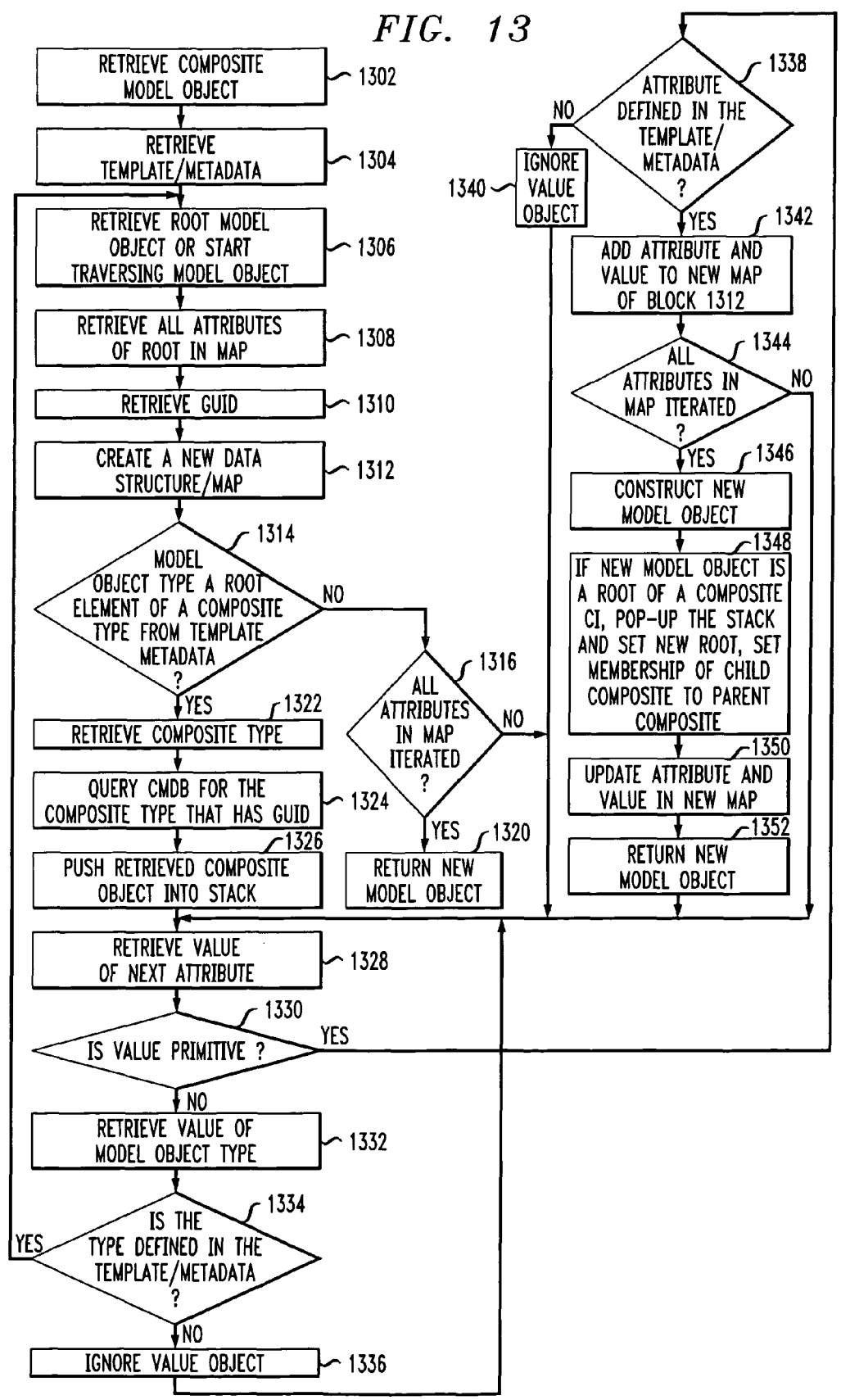
FIG. 13 is a flow diagram illustrating a retrieved composite model object pruning methodology, according to an embodiment of the present invention.

Referring now to FIG. 13, a flow diagram illustrates a retrieved composite model object pruning methodology, according to an embodiment of the present invention. The methodology is a depth first traversal of the CMDB containment tree of the root element, as it recursively traverses the subtrees rooted at the children of the root first, and then visits the root. This methodology will visit a node atomic CI 'v' after it has visited all the other CI nodes in the subtree rooted at 'v.' The traversal of a tree with n nodes take O(n) time assuming that visiting each node take O(1) time. The methodology begins in block 1302, where a composite model object is retrieved from the CMDB. In block 1304, the template and its metadata of the corresponding composite CI type are retrieved from the CMDB. The template may also be optionally cached from memory. In block 1306, the root model object of the composite model object is retrieved or the model object is traversed.

In block 1308, all the attributes of the root element model object are retrieved into a data structure/map. For example, HashMap map=modelobject.getAllAttributes( ), retrieves all the attributes that are primitive as well as attributes that contain/use other model objects. In block 1310, a globally unique identifier is retrieved, for example Guid_guid=(Guid) map.get("guid"). In block 1312, a new data structure is created, such as, for example, a map, and the guid of the retrieved model object is stored in the new map. In block 1314, it is determined if the model object type is a root element of a composite type from the template/metadata. If the model object is not a root element, it is determined in block 1316 if all attributes in the map have been iterated. If all attributes have been iterated, a new model object is returned and the methodology terminates in block 1320. If all attributes have not been iterated the methodology continues at block 1328, where a value of a next attribute is retrieved.

If the model object type is a root element in block 1314, the composite type is retrieved in block 1322. In block 1324, the CMDB is queried for the retrieved composite type that has the retrieved guid. For example, ModelObject_compMO=(ModelObject) Query.findByGuid(_compositeName,_compositeName,_guid.toString( ). In block 1326, the retrieved composite object is pushed into a stack. The methodology then continues at block 1328 where a value of a next attribute is retrieved in block 1328.

In block 1330, it is determined if the value is a primitive attribute or a non-primitive attribute. This check is performed through instrospection on the value object. If the value object is of type ModelObject or ModelObject[ ], then it is a non-primitive attribute and contains/uses those model objects as a part of the underlying containment graph in CMDB.

If the value of the attribute is not primitive in block 1330, the methodology continues at block 1332, where the value of the model object type is retrieved. It is then determined in block 1334 if the type is defined in the template definition and its metadata. These steps may be performed in the following manner: ModelObject_mObj=(ModelObject)valueObject; Class cls_=InterfaceIntrospector.getModelOjbectInterface(_mObj); String type=cls_getName( ). If the model object type is not defined in the atomic CI member list of the template and its metadata then the value object is ignored in block 1336. The methodology then returns to block 1328 to retrieve the value of a next attribute. If the model object is defined and preferably if the model object type is a root element of a composite CI type, the model object is recursively navigated and the methodology returns to block 1306.

These steps may be performed in the following manner for all the model objects in the value-object model object array:

```
ModelObject[ ] mArray = new ModelObject[_mObjs.length];
For(int k=0;k<_mObjs.length;k++)
{
    ModelObject_mObj = _mObjs[k];
ModelObject_tempObj = this.filterUsingTemplateMetadata(_mObj);
mArray[k] = _temObj
The pruned model object array is added to the map created in block 1312
as: newMap.put(obj, mArray);
```

If the value of the object is a primitive attribute in block 1330, it is determined if the attribute is defined in the composite template and its metadata in block 1338. If the attribute exists, the attribute and its value are added to the map created in block 1312 as newMap.put(key, attrValue) in block 1342.

Otherwise the attribute and its value are ignored in block 1340 and the methodology returns to block 1328 to retrieve the value of the next attribute.

In block 1344 it is determined if all attributes in the map have been iterated. If all attributes have not been iterated, the methodology returns to block 1328. If all attributes have been iterated, the methodology continues to block 1346, where a new model object is constructed in memory that represents the retrieved model object in CMDB. The new model object is pruned based on the template metadata and contains only the attributes that are in the template metadata definition and ignores all the attributes not defined in the template. The map created in block 1312 holds the pruned data structure/map. Using the new pruned data structure a new model object is created: ModelObject newMO=(ModelObject) ModelFactory.newInstance(_cls, newMap).

If the newly constructed model object is a root of a composite CI, the stack is popped up and the new root of the composite CI is set in block 1348. The stack is popped up again and the previous comp obj is set as a member of the current comp obj. The current comp obj is pushed to the stack. This is accomplished by the following pseudo code:

In block 1350, the attribute and value are updated in the new map. In block 1352 the new model object is returned and the methodology then returns to block 1328.

At the end of the navigation of the underlying containment relating to the composite root element and pruning/filtering accordingly and deriving the membership between the composites based on the relationships between the root atomic CIs in the CMDB, the resultant object is a single composite object that can contain other sub-composite members. Each of the composites contains a root element that is pruned according to the template metadata and can contain/use other model objects, which are pruned as well, as long as the child model object is defined in the composite template metadata.

All atomic CI attributes defined by the template are updatable from the context of the composite. Composites within a composite are not updatable from the context of a composite. Each composite should be updated individually. New atomic CI instances can be added or removed from the composite as long as the atomic CI type is defined in the template. This is particularly important because not all atomic CIs can be discovered and there should be an ability to explicitly create an atomic CI instance and draw relationships to its parent.

```
        if ( if the newly constructed model object is a root of composite CI )
{
        if (!(compStack.empty( ))) // If Stack not empty
        {
          if (compStack.size( ) > 1)
          {
            Composite child = (Composite) compStack.pop( );
            child.setRoot(newMO);
            Composite parent = (Composite) compStack.pop( );
            ArrayList newMemberList = new ArrayList( );
                if (parent.hasMembers( ))
                {
                  ModelObject[ ] members = parent.getMembers( );
                  for(int i=0; i<members.length;i++)
                  {
                    Composite comptemp = (Composite) members[i];
                    newMemberList.add(comptemp);
                  }
                  newMemberList.add(child);
                }else
                {
                  newMemberList.add(child);
                }
              if (newMemberList.size( ) > 0)
              parent.setMembers((ModelObject[ ]) newMemberList.toArray(new
ModelObject[newMemberList.size( )]));
                if (parent.hasMembers( ))
                {
                  ModelObject[ ] members = parent.getMembers( );
                  for(int i=0; i<members.length;i++)
                  {
                    Composite comptemp = (Composite) members[i];
                    LOG.debug("Member Composite-> " + comptemp.getType( ));
                  }
              compStack.push(parent);
          }else if (compStack.size( ) == 1)
          {
            Composite child = (Composite) compStack.pop( );
            String childRootGuid = child.getGuid( ).toString( );
            String newMOGuid = newMap.get("guid").toString( );
            child.setRoot(newMO);
            compStack.push(child);
          }
        }
}else
{
  Print the Model Object is "NOT A COMPOSITE Candidate"
}
```

For example, if a server composite has atomic CIs "Operating System" that contains "Software Installation". Not all software installations are discoverable, let's say there is a software that cannot be discovered but has been installed on that server. In this case, one should be able to create explicitly a new Software Installation instance and fill in the attribute data and associate/draw relationship with the "Operating System" instance that it is installed on, all within the context of the server composite.

The update API is the same as any other CI update, where the model object to be updated has to be passed (a composite model object) as a parameter.

Figure 14:
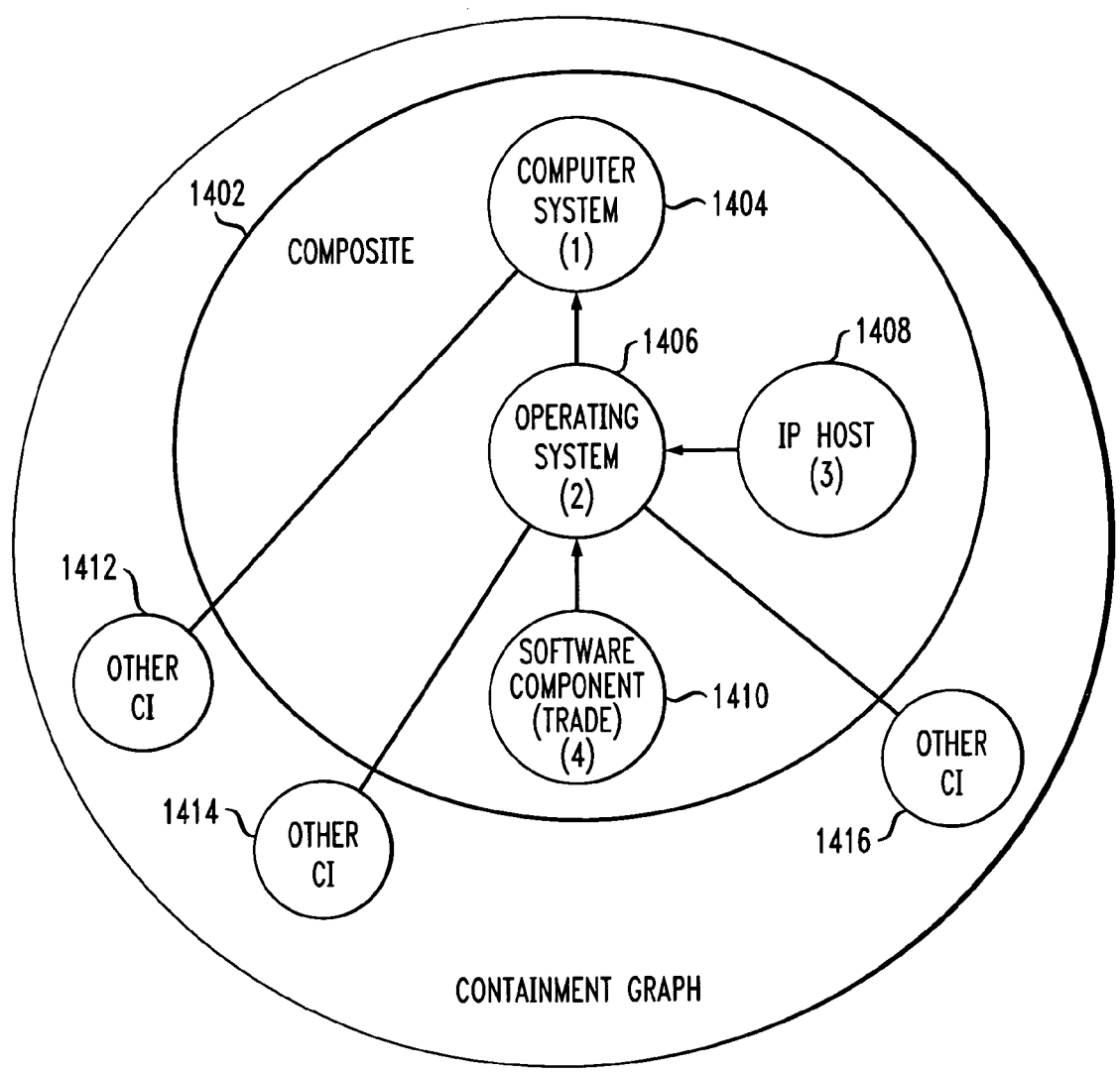
FIG. 14 is a diagram illustrating a containment graph of a composite CI, according to an embodiment of the present invention.

When a composite CI is deleted, it must be determined which of the supporting elements are also deleted and which supporting elements are preserved, but "disconnected" from the now-defunct composite CI. Referring now to FIG. 14, a diagram illustrates a containment graph of a composite CI, in accordance with an embodiment of the present invention. The design premise that is being observed is that the semantics of the relationships can tell the API how to deal with supporting elements on a delete. For example, a "uses" relationship would indicate that the supporting element being used should not be deleted. A "contains" relationship would indicate that the supporting element contained within the composite should be deleted when the composite is deleted. These relationship semantics should be well-defined and understood as the compositions are being modeled. In the composite CI embodiment shown in FIG. 14, composite 1402 contains computer system CI 1404, operating system CI 1406, IP host CI 1408 and software component CI 1410. However, composite 1402 uses and does not contain CIs 1412, 1414 and 1416.

Figure 15:
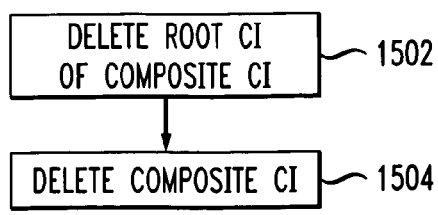
FIG. 15 is a flow diagram illustrating composite CI deletion methodology, according to an embodiment of the present invention.

Referring now to FIG. 15, a flow diagram illustrates a composite CI deletion methodology, according to an embodiment of the present invention. Typically, delete is a two step process: a root atomic CI is deleted in block 1502 and the corresponding composite CI is deleted in block 1504. Deleting a composite only deletes the atomic CIs contained in the parent composite that are in the containment graph. Deleting a composite does not delete any of the sub-composites that it "uses."

If a containment tree in CMDB spans multiple composite instances then a case where deletion of a parent element CI instance would trigger a cascading delete, deleting all the dependent child atomic CI instances that are in 'contains' relationship spanning the containment graph even if the atomic CIs are outside the boundary/scope of the composite.

A composite can contain shared CIs. CIs that can be shared (switches, routers, etc. which are shared across multiple accounts) are generally modeled via 'uses' relationships. If CIs that are in a 'uses' relationship are not deleted, deleting a composite does not delete the shared CIs it contains. Deletion of shared CIs can be done only by Configuration Manager.

Comparison is currently achieved by comparing the two composite model objects, when each composite model object is a compound structure/containment tree. Only composites of the same type can be compared. A server composite cannot be compared with a desktop composite even if similarities exist between these two composites.

Only the top level objects have supports relationship drawn to person in a role. Special internal user login mechanism exists for accessing subcomposite data that do not have explicit support relationships for a person accessing in that role. If a user in a role has a 'supports' relationship on a composite CI then, the 'supports' relationship is delegated to all the members in the composite. However, if the members are other composite CI instances, then such members have only read access. When a person in a role assigns a supports relation to a composite instance, supports relationship will not be added to all the other subcomposites. Every sub-composite instance should be given a supporting relationship to person in a role explicitly.

Below is a sample definition of a server composite CI template:

```
<?xml version="1.0" encoding="UTF-8"?>
<xs:Composite xmlns:xs="
http://www.ibm.com/com/collation/proxy/api/server/composite/schema/"
xmlns:xsi="http://www.w3.org/2001/XMLSchema-instance"
xsi:schemaLocation="
http://www.ibm.com/com/collation/proxy/api/server/composite/schema/
CompositeSchema.xsd ">
    <CompositeType>server</CompositeType>
    <Root>
        <Name>ComputerSystem</Name>
        <PrimitiveAttributeList>
                systemBoardUUID, controllers, functions, serialNumber,
OSInstalled,
                signature, protocolControllers, fqdn, systemId,
                snmpSystemGroup, ipInterfaces, OSRunning, ip1nterfaces,
                devices, description, model, manufacturer
        </PrimitiveAttributeList>
    <NonPrimitiveMember>
        <Name>OSInstalled</Name>
        <Class>
            <AtomicCI>
                <Name>OperatingSystem</Name>
                <PrimitiveAttributeList>
                    name, softwareComponents, DNSResolveEntries,
                    description, OSName, systemGuid, OSVersion, osId
                </PrimitiveAttributeList>
                <NonPrimitiveMember>
                <Name>installedSoftware</Name>
                <Class>
                    <AtomicCI>
                        <Name>SoftwareInstallation</Name>
                        <PrimitiveAttributeList>
                            installedLocation, productName,
                            description, manufacturerName,
                            productId, parent, productVersion
                        </PrimitiveAttributeList>
                    </AtomicCI>
                </Class>
                <Relationship>contains</Relationship>
                </NonPrimitiveMember>
            </AtomicCI>
        </Class>
        <Relationship>contains</Relationship>
    </NonPrimitiveMember>
    < NonPrimitiveMember >
        <Name>fileSystems</Name>
        <Class>
            <AtomicCI>
            <Name>FileSystem</Name>
            <PrimitiveAttributeList>
                    mountPoint, parent, description
            </PrimitiveAttributeList>
        <AtomicCI>
    </Class>
    <Relationship>contains</Relationship>
    </NonPrimitiveMember>
    </Root>
</xs:Composite>
```

Figure 16:
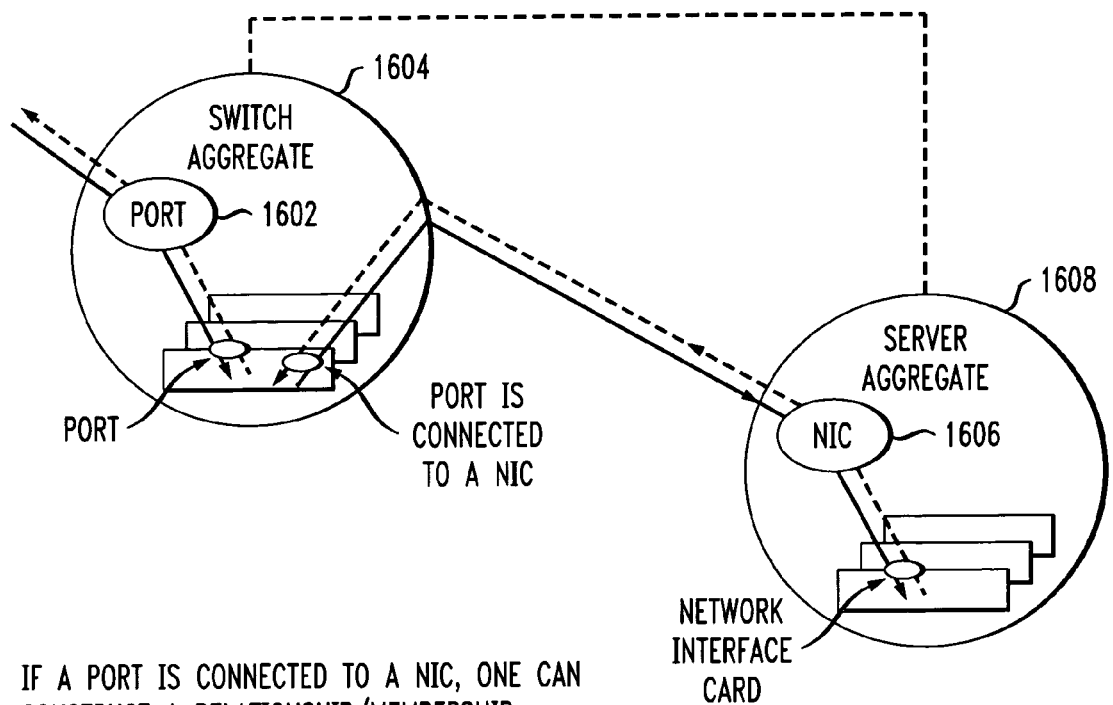
FIG. 16 is a diagram illustrating an implied relationship between composites, according to an embodiment of the present invention.

Referring now to FIG. 16, a diagram illustrates an implied relationship between composites, according to an embodiment of the present invention. A port 1602 of a switch aggregate 1604 is connected to a NIC 1606 of a server aggregate 1608. Thus, one can construct a relationship and/or membership between switch and server compositions.

Figure 17:
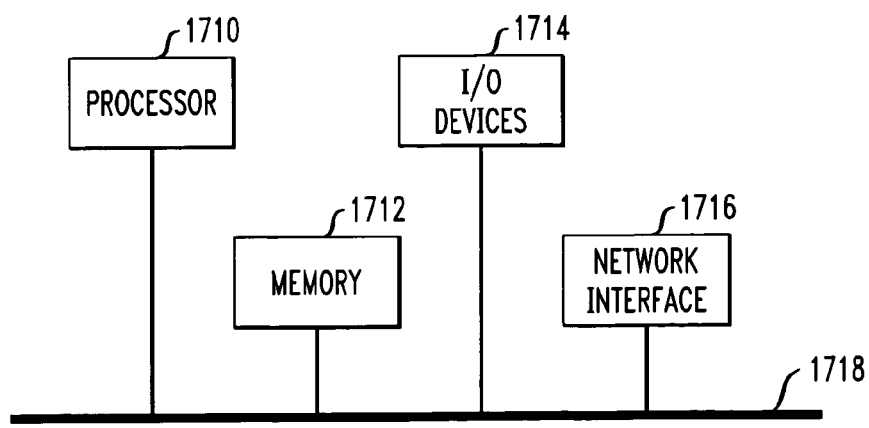
FIG. 17 is a diagram illustrating an illustrative hardware implementation of a computing system in accordance with which one or more components/methodologies of the present invention may be implemented, according to an embodiment of the present invention.

Referring now to FIG. 17, a block diagram illustrates an exemplary hardware implementation of a computing system in accordance with which one or more components/methodologies of the invention (e.g., components/methodologies described in the context of FIGS. 1-16) may be implemented, according to an embodiment of the present invention.

As shown, the computer system may be implemented in accordance with a processor 1710, a memory 1712, I/O devices 1714, and a network interface 1716, coupled via a computer bus 1718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method of managing a configuration management database, comprising executing the following steps via a computer:

creating at least one composite configuration item in the configuration management database, the at least one composite configuration item comprising one or more supporting elements of the configuration management database and the at least one composite configuration item being represented as a graph of navigable relationships between the one or more supporting elements in accordance with a template, wherein the one or more supporting elements of a given composite configuration item comprise a root element of the given composite configuration item; and retrieving information from the at least one composite configuration item in accordance with a query and the template of the at least one composite configuration item, wherein one or more attributes of the query are replaced using one or more corresponding definitions of the template;

wherein the root element of the given composite configuration item is an atomic configuration item of a type specified by the template of the at least one composite configuration item, wherein the atomic configuration item is the root element of only the given composite configuration item such that the atomic configuration item uniquely identifies the given composite configuration item within the configuration management database.

2. The method of claim 1, wherein the one or more supporting elements comprise one or more configuration items of the configuration management database.

3. The method of claim 2, wherein the one or more configuration items comprise at least one composite configuration item.

4. The method of claim 1, wherein the navigable relationships comprise at least one of a use relationship and a contain relationship.

5. The method of claim 1, wherein the at least one composite configuration item is a distinct first class data object of the configuration management database.

6. The method of claim 1, wherein the template comprises the root element, and at least one of a composite type, a life cycle state, a version and support information.

7. The method of claim 1, wherein the root element comprises at least one of a name, a primitive attribute list, a non-primitive member, a lifecycle state and a configuration item version.

8. The method of claim 1, wherein data in the at least one composite configuration item is pruned in accordance with the template.

9. The method of claim 1, wherein metadata in the configuration management database is generated in accordance with the template.

10. The method of claim 1, further comprising the step of establishing relationships between higher-level composite abstractions based on relationships between atomic configuration items in the configuration management database.

11. The method of claim 1, wherein the step of creating the at least one composite configuration item is automatic upon discovery of a new configuration item in the configuration management database.

12. The method of claim 1, wherein the step of creating the at least one composite configuration item comprises the steps of:

defining at least one composite configuration item having at least one of a name, a set of attributes and associated naming rules; and selecting a root element of the specified type for the at least one composite configuration item.

13. The method of claim 12, wherein the step of selecting a root element comprises the steps of:

retrieving a list of root elements of the specified type for the at least one composite configuration item in accordance with specified search criteria; and selecting the root element from the list of root elements.

14. The method of claim 12, wherein the step of selecting a root element comprises the step of creating the root element of the specified type for the at least one composite configuration item.

15. The method of claim 1, wherein the step of retrieving information comprises the steps of:

determining a composition type of the at least one composite configuration item;

retrieving a template for the composite type;

transforming the query in accordance with the template for the composite type; and executing the query to retrieve desired information from the at least one composite configuration item.

16. The method of claim 1, further comprising the step of updating the at least one composite configuration item.

17. The method of claim 16, wherein the step of updating the at least one composite configuration item comprises the step of at least one of adding and removing configuration items to the composite configuration item.

18. The method of claim 1, further comprising the step of deleting the at least one composite configuration item.

19. The method of claim 18, wherein, in the step of deleting the at least one composite configuration item, configuration items contained in the composite configuration item are deleted.

20. The method of claim 1, further comprising the step of comparing the at least one composite configuration item to another composite configuration item.

21. Apparatus for managing a configuration management database, comprising:
   a memory; and
   at least one processor coupled to the memory and operative to: create at least one composite configuration item in the configuration management database, the at least one composite configuration item comprising one or more supporting elements of the configuration management database and the at least one composite configuration item being represented as a graph of navigable relationships between the one or more supporting elements in accordance with a template, wherein the one or more supporting elements of a given composite configuration item comprise a root element of the given composite configuration item; and retrieve information from the at least one composite configuration item in accordance with a query and the template of the at least one composite configuration item, wherein one or more attributes of the query are replaced using one or more corresponding definitions of the template;
   wherein the root element of the given composite configuration item is an atomic configuration item of a type specified by the template of the at least one composite configuration item, wherein the atomic configuration item is the root element of only the given composite configuration item such that the atomic configuration item uniquely identifies the given composite configuration item within the configuration management database.

22. A computer program product for managing a configuration management database, the computer program product comprising:
   a computer-readable medium;
   a first program instruction to create at least one composite configuration item in the configuration management database, the at least one composite configuration item comprising one or more supporting elements of the configuration management database and the at least one composite configuration item being represented as a graph of navigable relationships between the one or more supporting elements in accordance with a template, wherein the one or more supporting elements of a given composite configuration item comprise a root element of the given composite configuration item; and
   a second program instruction to retrieve information from the at least one composite configuration item in accordance with a query and the template of the at least one composite configuration item, wherein one or more attributes of the query are replaced using one or more corresponding definitions of the template,
   wherein the first and second program instructions are stored on the computer-readable medium;
   wherein the root element of the given composite configuration item is an atomic configuration item of a type specified by the template of the at least one composite configuration item, wherein the atomic configuration item is the root element of only the given composite configuration item such that the atomic configuration item uniquely identifies the given composite configuration item within the configuration management database.

* * * * *